(12) United States Patent
Kawashima

(10) Patent No.: US 9,912,578 B2
(45) Date of Patent: Mar. 6, 2018

(54) IMAGE COMMUNICATION APPARATUS, CONTROL METHOD FOR THE SAME, AND COMPUTER-READABLE STORAGE MEDIUM

(71) Applicant: CANON KABUSHIKI KAISHA, Tokyo (JP)

(72) Inventor: Yasuaki Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 14/644,324

(22) Filed: Mar. 11, 2015

(65) Prior Publication Data

US 2015/0281043 A1    Oct. 1, 2015

(30) Foreign Application Priority Data

Mar. 25, 2014   (JP) ................................. 2014-062726

(51) Int. Cl.
| | |
|---|---|
| *G06F 15/16* | (2006.01) |
| *H04L 12/721* | (2013.01) |
| *H04L 29/06* | (2006.01) |
| *H04N 1/00* | (2006.01) |

(52) U.S. Cl.
CPC ............ *H04L 45/14* (2013.01); *H04L 69/02* (2013.01); *H04N 1/00244* (2013.01); *H04L 63/08* (2013.01)

(58) Field of Classification Search
USPC ................................................ 709/203, 217
See application file for complete search history.

(56) References Cited

U.S. PATENT DOCUMENTS

| | | | |
|---|---|---|---|
| 2009/0201557 A1* | 8/2009 | Honma | .............. H04N 1/00244 358/402 |
| 2011/0188076 A1* | 8/2011 | Maeda | ..................... G06F 15/00 358/1.15 |
| 2012/0079064 A1 | 3/2012 | Fukushima | ................... 709/217 |
| 2015/0096047 A1 | 4/2015 | Kawashima | ............ G06F 21/62 |

FOREIGN PATENT DOCUMENTS

| | | |
|---|---|---|
| JP | 2006140763 A | 6/2006 |
| JP | 2007122492 A | 5/2007 |
| JP | 2012-070342 | 4/2012 |
| JP | 2012123765 A | 6/2012 |
| JP | 2012150581 A | 8/2012 |
| JP | 2013198048 A | 9/2013 |

OTHER PUBLICATIONS

Japanese Office Action issued in corresponding Japanese Application No. 2014-062726 dated Nov. 20, 2017.

* cited by examiner

*Primary Examiner* — Hee Soo Kim

(74) *Attorney, Agent, or Firm* — Fitzpatrick, Cella, Harper & Scinto

(57) ABSTRACT

When a forwarding destination of image data is set, the forwarding destination can be designated via an input screen for inputting destination information or the forwarding destination can be designated via an address book. When setting of the forwarding destination via the input screen for inputting destination information is instructed, connection confirmation based on destination information input via the input screen is performed, and when this connection confirmation is made, the destination information input via the input screen is set and registered as the forwarding destination.

8 Claims, 10 Drawing Sheets

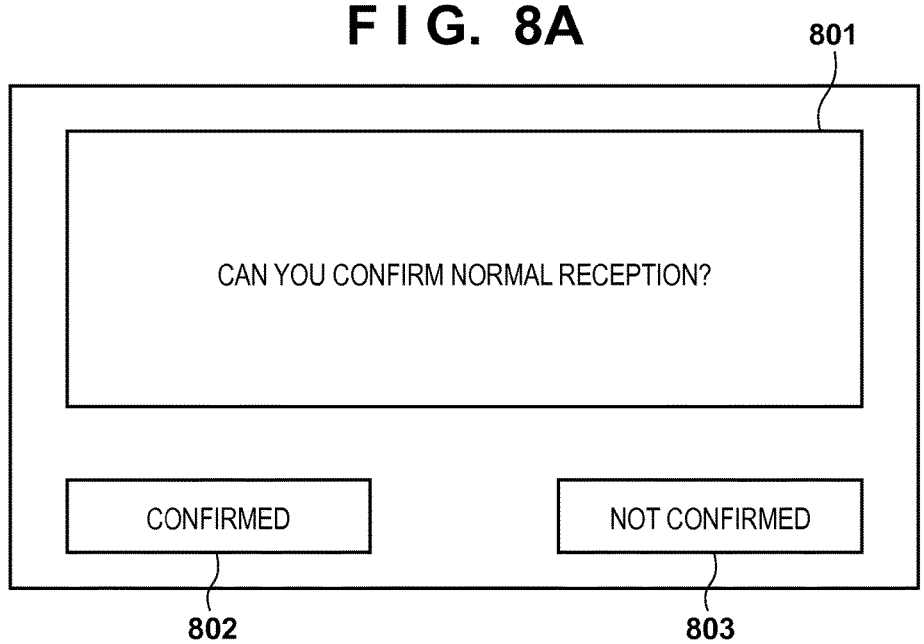
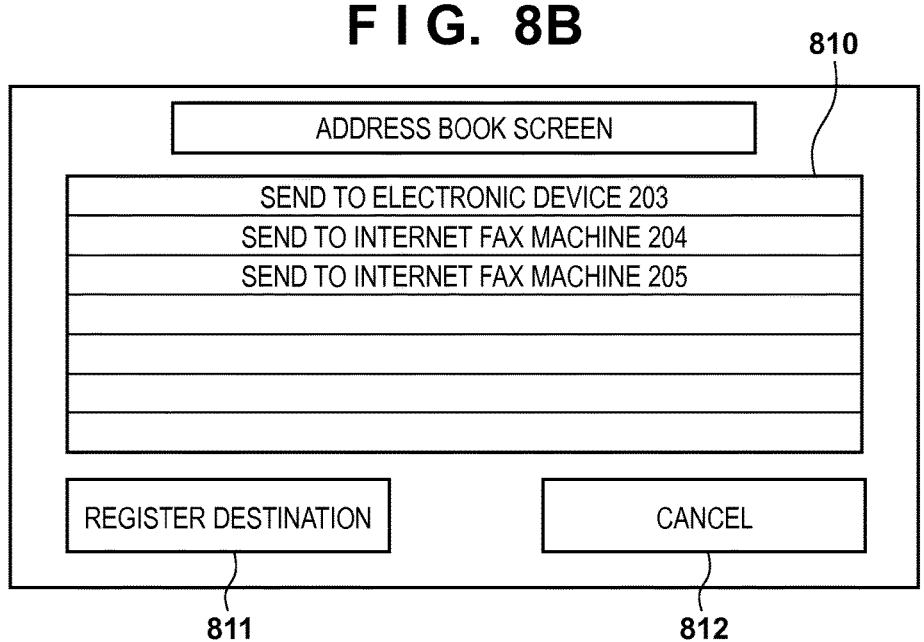

IMAGE COMMUNICATION APPARATUS, CONTROL METHOD FOR THE SAME, AND COMPUTER-READABLE STORAGE MEDIUM

BACKGROUND OF THE INVENTION

Field of the Invention

The present invention relates to an image communication apparatus, a control method for the same, and a computer-readable storage medium.

Description of the Related Art

There is forwarding technology for forwarding image data or the like received by an image communication apparatus to an external device, based on a forwarding setting configured in the image communication apparatus. Destination information serving as a forwarding destination is included in this forwarding setting, and the destination information references a destination that is included in an address book of the image communication apparatus or an address book that is held in the external device. Furthermore, there is technology for disabling the forwarding setting in the case where the destination information that is included in the forwarding setting cannot be referenced. However, if the destination information that could not be referenced is a destination that is held in the external device and the reason for not being able to reference the destination information is a temporary communication error with the external device, it may become possible to access the destination information with the passage of time. Accordingly, disabling the forwarding setting due to a temporary communication error compromises convenience.

Japanese Patent Laid-Open No. 2012-70342 discloses technology that, in the case where destination information could not be acquired from the address book of an external device, does not disable the forwarding setting if the reason for not being able to acquire the destination information is a temporary communication error.

However, with the above conventional technology, there is a problem in that, when registering a forwarding setting, the destination information of the forwarding destination is selected and set from an address book, and a destination cannot be newly registered in the series of operations for registering the forwarding setting, thus compromising convenience.

Since forwarding of received image data is executed automatically by the image communication apparatus when the image communication apparatus receives image data, the user of the image communication apparatus is not able to grasp the forwarding result in real time. This is because a configuration is adopted in which the destination information of the forwarding destination is selected and set from an address book that has previously been used in transmission as mentioned above, since it is preferable to avoid input errors or the like in the destination information of the forwarding destination that is to be registered.

Also, in the above conventional technology, it is determined whether to disable the forwarding setting based on the reason for not being able to acquire the destination information of the forwarding destination. Thus, the forwarding setting cannot be disabled in the case where destination information to which transmission of image data cannot be performed is, due to an input error or the like, registered as the destination information of the forwarding destination that is included in the forwarding setting.

SUMMARY OF THE INVENTION

An object of the present invention is to provide technology that, when a forwarding destination is set, enables the forwarding destination to be set with destination information that was input via an input screen and to which a reliable connection can be established.

In order to achieve the above object, an image communication apparatus according to one aspect of the present invention is provided with the following configuration. That is, a destination registration unit configured to, when a forwarding destination of image data is set, designate the forwarding destination via an input screen for inputting destination information; a forwarding destination designation unit configured to, when a forwarding destination of image data is set, designate the forwarding destination via an address book; a confirmation unit configured to, when setting of the forwarding destination by the destination registration unit is instructed, perform connection confirmation based on destination information input via the input screen; and a control unit configured to, when connection confirmation by the confirmation unit is made, perform control so as to set, as the forwarding destination, the destination information input via the input screen.

The present invention has the effect of being able to set and register destination information to which transmission can be reliably performed, even when a destination is newly registered in processing for setting a forwarding destination.

Further features of the present invention will become apparent from the following description of exemplary embodiments (with reference to the attached drawings).

Note that, in the accompanying drawings, the same reference numerals are given to constituent elements that are the same or similar.

BRIEF DESCRIPTION OF THE DRAWINGS

The accompanying drawings, which are included in the specification and constitute part thereof, show embodiments of the invention and are used together with the description of the embodiments to illustrate the principles of the invention.

FIG. 8A is a diagram showing an exemplary query screen.

FIG. 8B is a diagram showing an exemplary address book screen.

DESCRIPTION OF THE EMBODIMENTS

Hereinafter, embodiments of the present invention will be described in detail with reference to the accompanying drawings. Note that the embodiments described below are not intended to limit the present invention as defined in the claims, and not all combinations of the features described in these embodiments are essential to means for solving the problems addressed by the invention.

Figure 1:
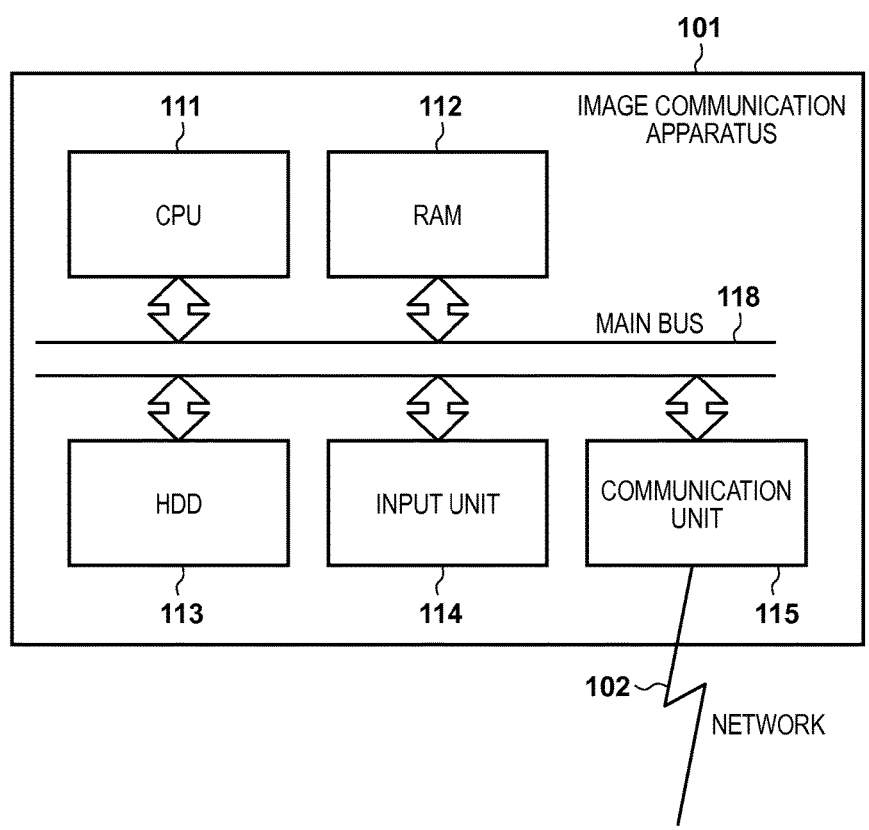
FIG. 1 is a block diagram illustrating the hardware configuration of an image communication apparatus.

FIG. 1 is a block diagram illustrating a hardware configuration of an image communication apparatus 101 according to the present embodiment.

This image communication apparatus 101 is connected to a network 102, and can communicate with other external devices via this network 102. A CPU 111 controls the image communication apparatus 101. The CPU 111 controls the operations of the image communication apparatus 101 by expanding a program stored on a hard disk drive (HDD) 113 in a RAM 112, and executing the program. The RAM 112 provides a work area for the CPU 111 as well as storing programs to be executed by the CPU 111. The HDD 113 stores programs and various settings to be executed by the CPU 111, as well as image files and the like. An input unit 114 is used by a user to configure various settings via GUIs (graphic user interfaces). A communication unit 116 controls communication with external devices via the network 102. A main bus 118 connects these units to the CPU 111.

Note that, in the present embodiment, unless specifically stated otherwise, processing according to the present embodiment is implemented in the image communication apparatus 101 by the CPU 111 controlling the RAM 112, the HDD 113, the input unit 114 and the communication unit 116 via the main bus 118. Also, an address book storing destination information that is used by a general file transmission function, and a destination setting (hereinafter, forwarding setting) for forwarding image data received by the image communication apparatus 101 via the communication unit 116 are registered in the HDD 113. Also, the input unit 114 is provided with a display unit provided with a touch panel function, hard keys and the like.

Figure 2:
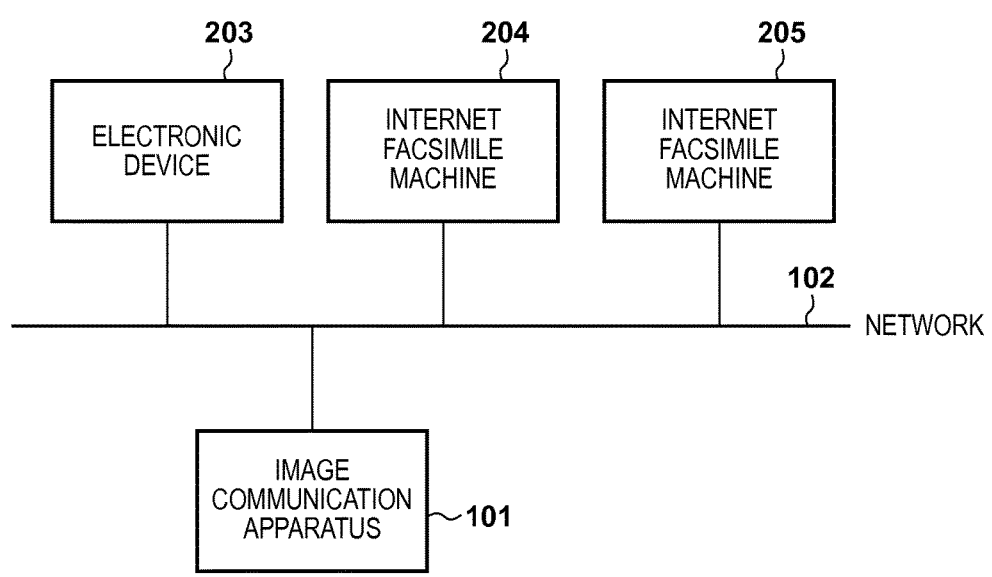
FIG. 2 is a diagram showing an exemplary configuration of a communication system that includes the image communication apparatus.

FIG. 2 is a diagram showing an exemplary configuration of a communication system that includes the image communication apparatus 101 according to the present embodiment.

In this communication system, the image communication apparatus 101 according to the present embodiment is connected to an electronic device 203 and Internet facsimile machines 204 and 205 via the network 102.

Figure 3:
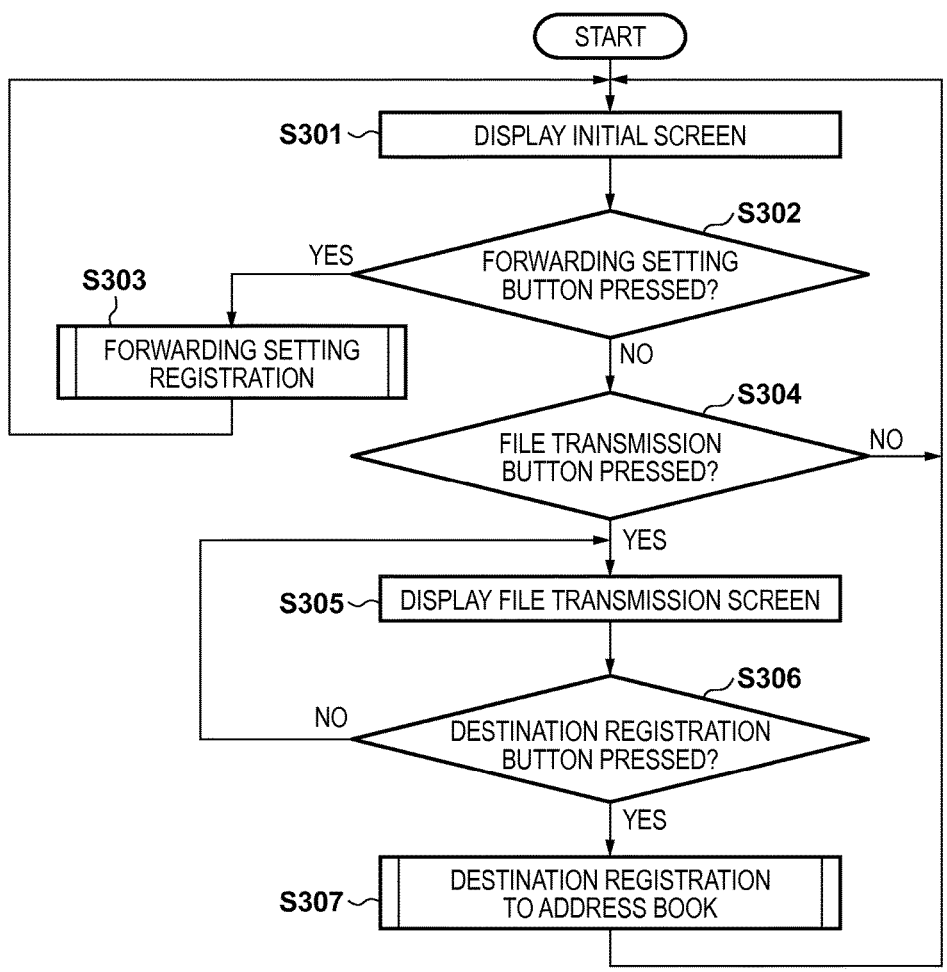
FIG. 3 is a flowchart illustrating registration processing to an address book at the time of forwarding setting and file transmission in the image communication apparatus.

FIG. 3 is a flowchart illustrating registration processing to an address book at the time of forwarding setting and file transmission in the image communication apparatus 101 according to the present embodiment. A program for executing the processing shown in this flowchart is installed in the HDD 113, and this program is expanded in the RAM 112 at the time of execution, and the processing that is shown in this flowchart is executed under the control of the CPU 111.

Figure 4A:
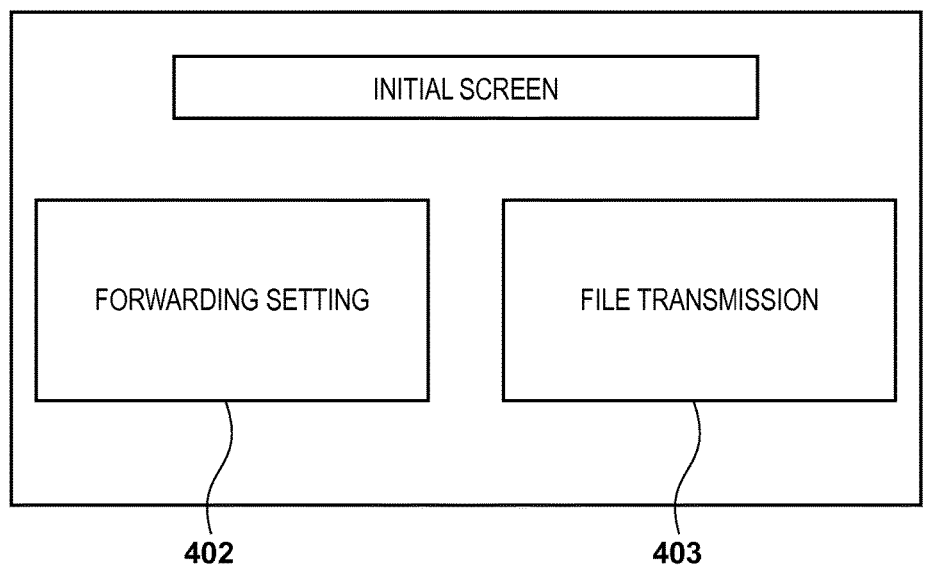
FIG. 4A is a diagram showing an exemplary initial screen that is displayed on an input unit of the image communication apparatus.

This processing is started by turning on a power supply of the image communication apparatus 101. First, at S301, an initial screen of the image communication apparatus 101 such as shown in FIG. 4A, for example, is displayed on the display unit of the input unit 114, and the processing proceeds to S302. Note that this display unit may have a touch panel function.

FIG. 4A is a diagram showing an exemplary initial screen that is displayed on the input unit 114 of the image communication apparatus 101.

A forwarding setting button 402 for instructing to start forwarding setting and a file transmission button 403 for calling a file transmission function are displayed on this initial screen.

Next, the processing proceeds to S302 and the CPU 111 determines whether the forwarding setting button 402 was pressed on the initial screen of FIG. 4A. The processing proceeds to S303 when it is determined that the forwarding setting button 402 was pressed, and the CPU 111 executes forwarding setting registration processing, which will be discussed later with reference to FIGS. 5A and 5B, and proceeds to S301.

On the other hand, the processing proceeds to S304 when it is determined at S302 that the forwarding setting button 402 was not pressed, and the CPU 111 determines whether the file transmission button 403 was pressed on the initial screen of FIG. 4A. The processing returns to S301 when it is determined here that the file transmission button 403 was not pressed. The processing proceeds to S305 when it is determined at S304 that the file transmission button 403 was pressed, and the CPU 111 displays an operation screen of the file transmission function for setting the file transmission function such as shown in FIG. 4B, for example, and proceeds to S306.

Figure 4B:
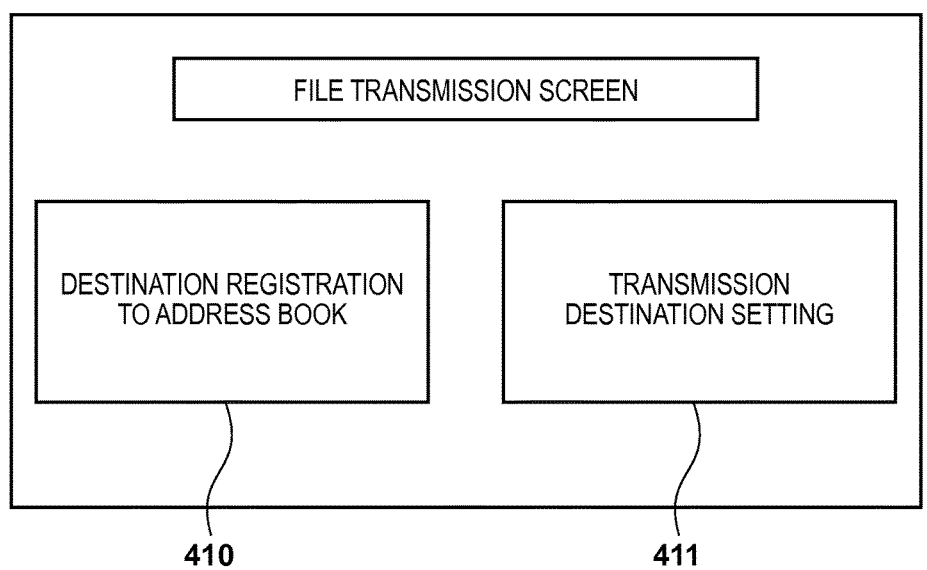
FIG. 4B is a diagram showing an exemplary file transmission screen.

FIG. 4B is a diagram showing an exemplary file transmission screen that is displayed on the input unit 114 of the image communication apparatus 101.

A registration button 410 for registering destination information in an address book and a transmission destination setting button 411 for setting a transmission destination are displayed on this file transmission screen.

At S306, the CPU 111 determines whether the registration button 410 for registering in an address book was pressed. When the registration button 410 was not pressed, the processing proceeds to S305, whereas if the registration button 410 was pressed, the processing proceeds to S307. At S307, the CPU 111 executes destination registration processing to an address book, which will be discussed later with reference to the flowchart of FIG. 9, and returns to S301 when the processing of S307 ends.

Next, the forwarding setting registration processing of S303 in FIG. 3 will be described with reference to the flowcharts of FIGS. 5A and 5B.

Figure 5A:
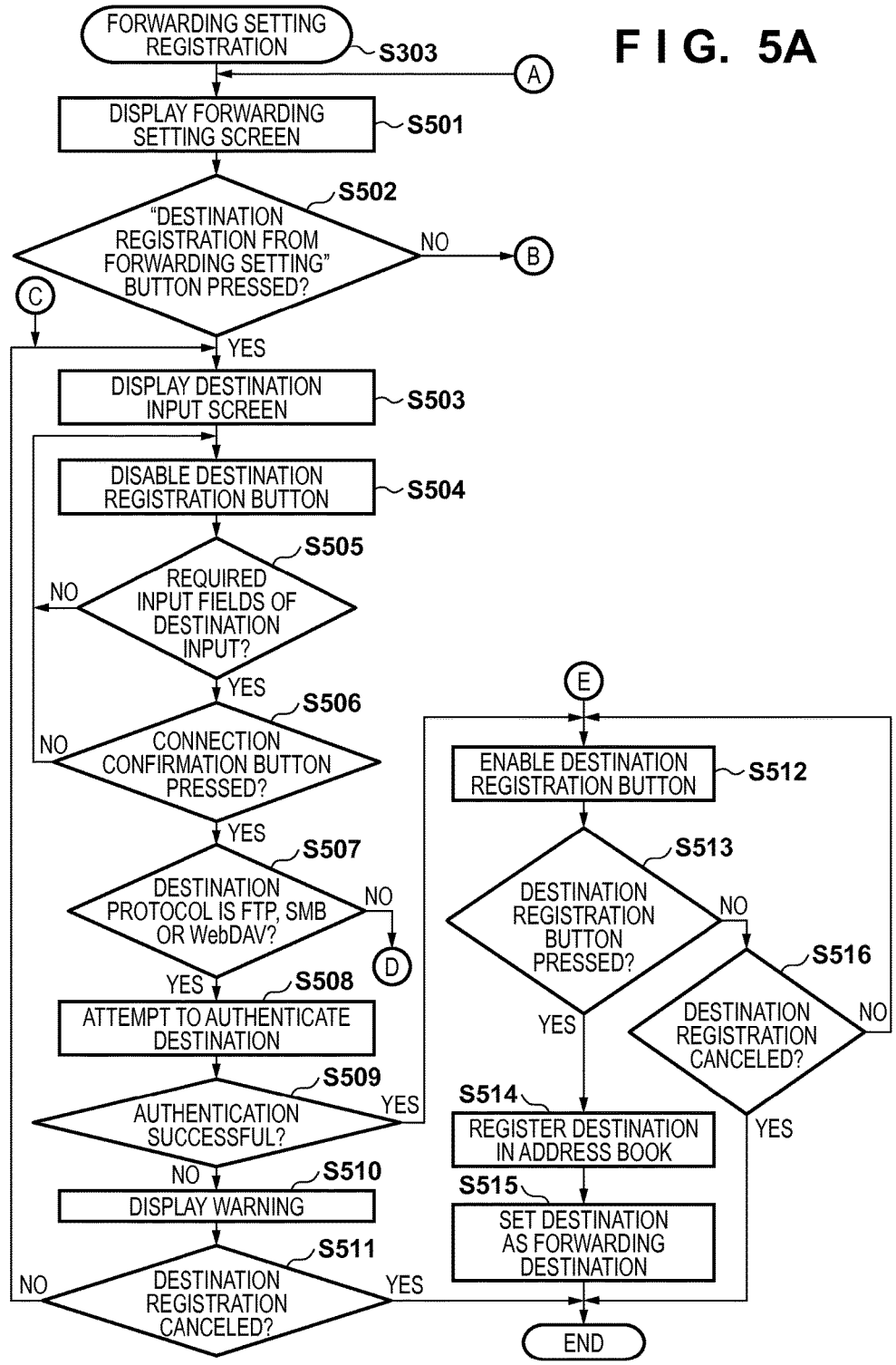
FIG. 5A is a flowchart illustrating forwarding setting registration processing of S303 in FIG. 3.
Figure 5B:
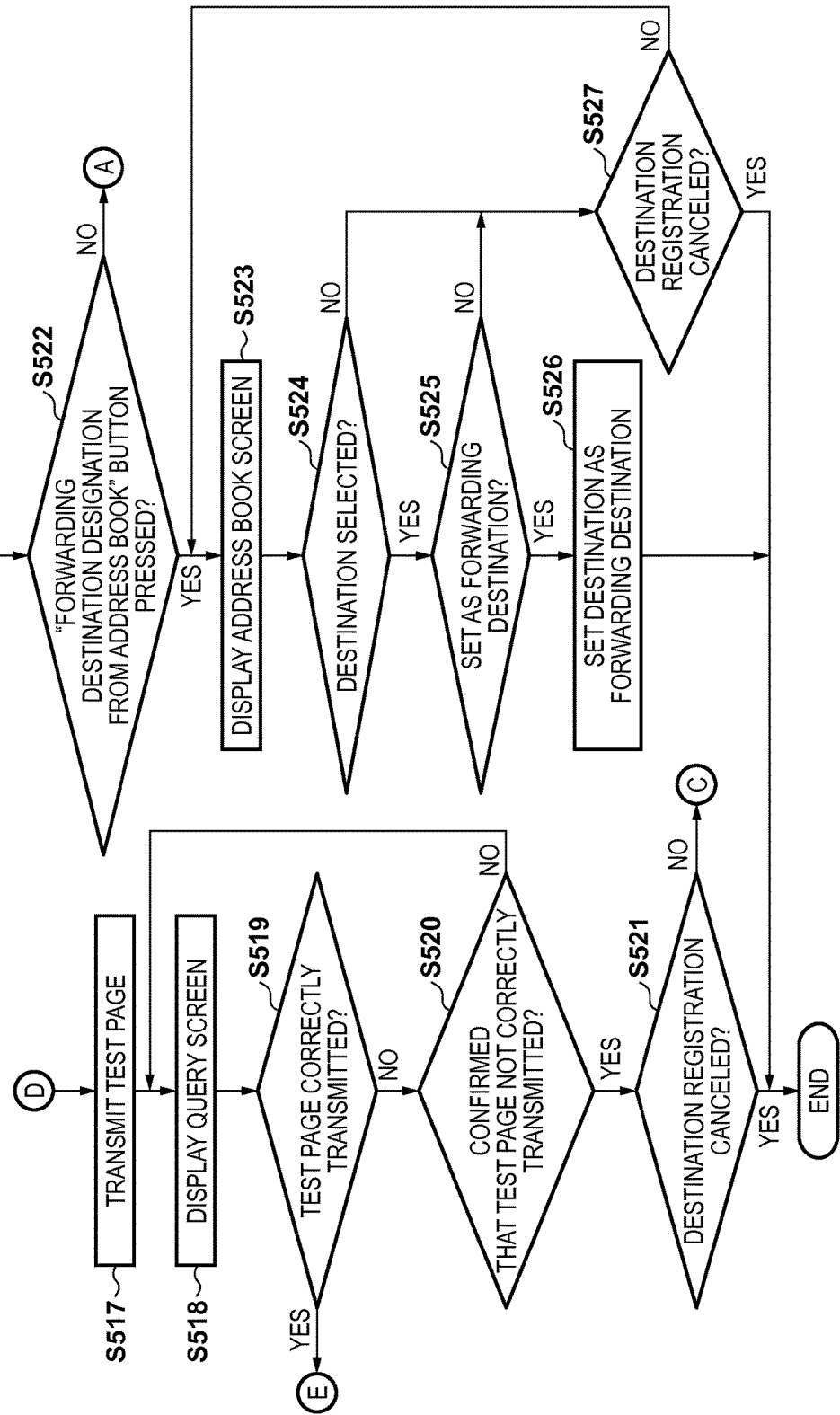
FIG. 5B is a flowchart illustrating forwarding setting registration processing of S303 in FIG. 3.

FIGS. 5A and 5B are flowcharts illustrating the forwarding setting registration processing of S303 in FIG. 3.

Figure 6A:
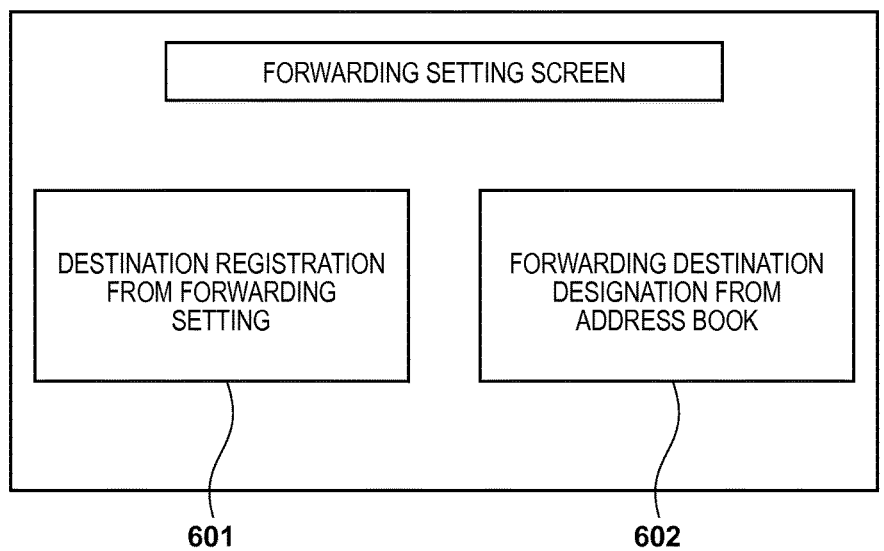
FIG. 6A is a diagram showing an exemplary forwarding setting screen.

First, at S501 in FIG. 5A, the CPU 111 displays a forwarding setting screen such as shown in FIG. 6A, for example.

FIG. 6A is a diagram showing an exemplary forwarding setting screen according to the present embodiment.

An "Address registration from forwarding setting" button 601 and a "Forwarding destination designation from address book" button 602 are displayed on this screen.

Next, the processing proceeds to S502 and the CPU 111 determines whether the destination registration button 601 was pressed on the screen of FIG. 6A. The processing proceeds to S503 when the destination registration button 601 was pressed, and an input screen for inputting a destination to be registered such as shown in FIG. 6B, for example, is displayed.

Figure 6B:
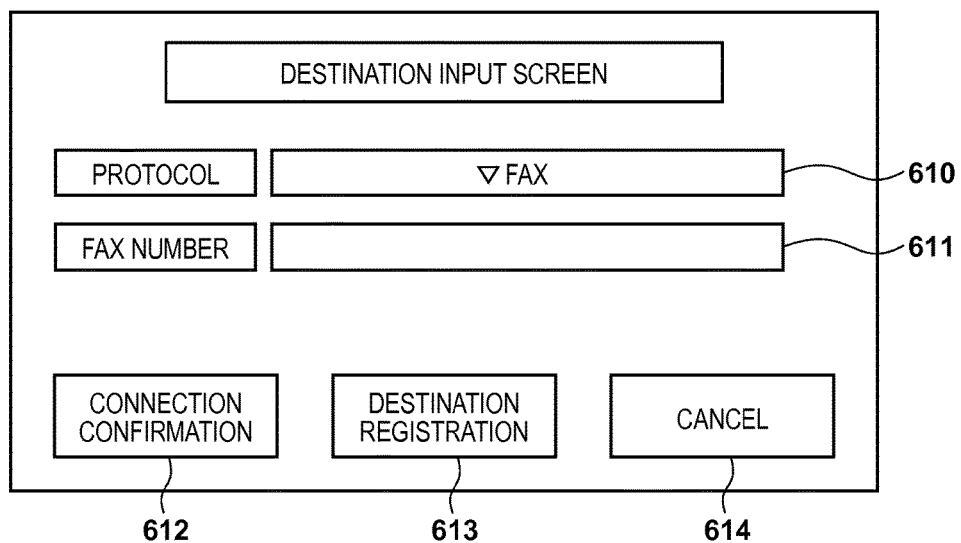
FIG. 6B is a diagram showing an exemplary destination input screen.

FIG. 6B is a diagram showing an exemplary destination input screen in the case of FAX transmission according to the present embodiment.

In FIG. 6B, a communication protocol for use when transmitting to the destination to be registered can be selected in a protocol selection field 610 of the input screen for inputting a destination to be registered. Here, file transmission functions such as FTP, SMB and WebDAV, as well as FAX, Internet FAX, and E-mail can be selected. FIG. 6B shows an exemplary input screen on which FAX is designated as the protocol. A facsimile number is input to an input area 611 corresponding to FAX. A connection confirmation button 612 is a button for instructing to confirm whether transmission of image data is possible to the destination input on this screen. The destination registration button 613 is a button for registering a destination input on this screen as the forwarding destination. A cancel button 614 is a button for cancelling input on this screen.

Figure 7A:
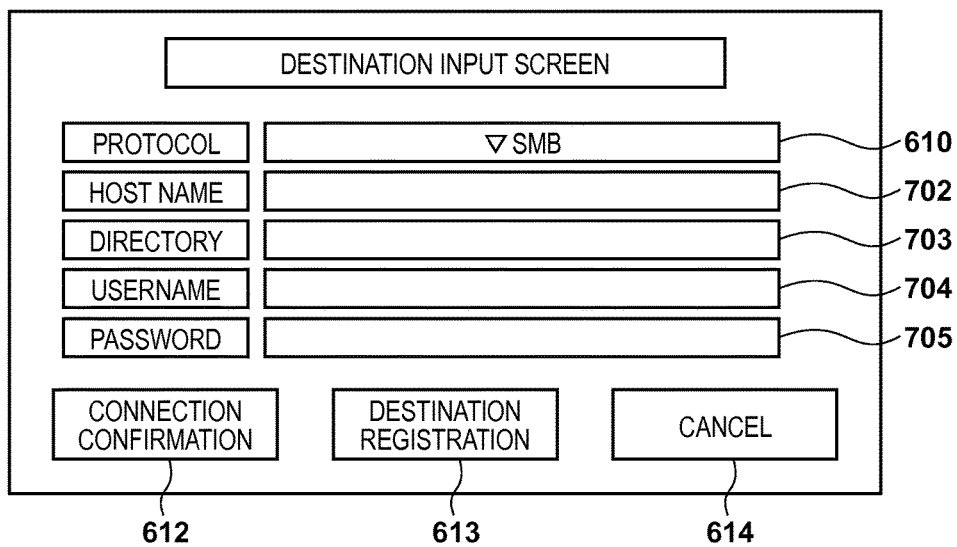
FIG. 7A is a diagram showing an exemplary destination input screen in the case of SMB.
Figure 7B:
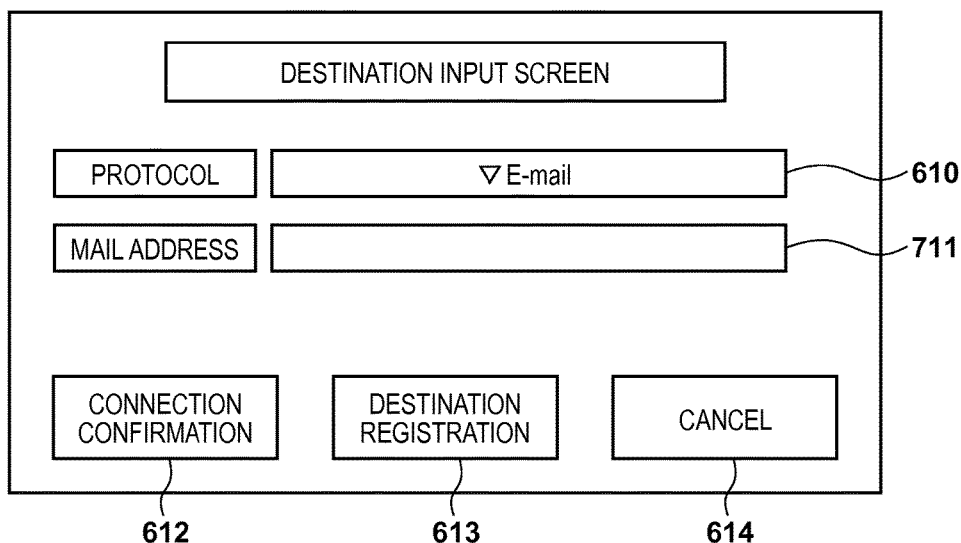
FIG. 7B is a diagram showing an exemplary destination input screen in the case of E-mail.

In the case of file transmission such as FTP, SMB or WebDAV, the destination input screen shown in FIG. 7A is displayed, and in the case of E-mail, a destination input screen such as shown in FIG. 7B is displayed.

On the destination input screen of FIG. 7A, there is a protocol selection field 610 and the input fields Host name 702, Directory 703, Username 704 and Password 705. The connection confirmation button 612, the destination registration button 613, and the cancel button 614 are also provided here similarly to FIG. 6B.

On the destination input screen of FIG. 7B, E-mail is selected in the protocol selection field 610, and a mail address is input to a mail address input field 711.

Next, the processing proceeds to S504 and the CPU 111 disables the destination registration button 613 on the destination input screen. This is in order to temporarily prevent registration, since it is not known at this point in time whether the destination that has been input here is a correct destination that meets the registration requirements. Next, the processing proceeds to S505 and the CPU 111 determines whether the required fields of the destination have been input. This determines whether a FAX number has been input in the case of a FAX, whether a mail address has been input in the case of an E-mail, and whether the fields shown in FIG. 7A have all been input in the case of SMB.

If it is determined here that all the required fields have not been input, the processing returns to S504, whereas the processing proceeds to S506 when it is determined that all the required fields have been input. At S506, the CPU 111 determines whether the connection confirmation button 612 was pressed. When the connection confirmation button 612 was not pressed, the processing returns to S504, whereas the processing proceeds to S507 when it is determined that the connection confirmation button 612 was pressed and an instruction calling the connection confirmation function has been given.

At S507, the CPU 111 confirms the protocol of the destination input to the protocol selection field 610. The processing proceeds to S508 when it is determined here that the protocol is one of FTP, SMB and WebDAV, and the CPU 111 attempts to authenticate the host computer input to Host name 702 on the screen of FIG. 7A, using the information input to Username 704 and Password 705. The processing proceeds to S509 and the CPU 111 determines whether authentication was successful. If authentication was successful, the processing proceeds to S512, whereas if authentication failed, the processing proceeds to S510 and a warning indicating that a connection could not be established to the input destination is displayed. The processing proceeds to S511 and the CPU 111 determines whether the cancel button 614 was pressed on the screen of FIG. 7A and an instruction to cancel registration of an address has been given. When the cancel button 614 was not pressed, the processing returns to S503 and the aforementioned processing is executed, whereas this processing is ended when the cancel button 614 was pressed.

On the other hand, the processing proceeds to S512 when the CPU 111 determines at S509 that authentication was successful, and the destination registration button 613 of the destination input screen is enabled so that the button can be pressed. The processing then proceeds to S513 and the CPU 111 determines whether the destination registration button 613 was pressed. When this button was pressed, the processing proceeds to S514, and the input destination is registered in the address book constituted in the HDD 113. The processing then proceeds to S515 and the CPU 111 registers the registered destination in the forwarding setting that is recorded on the HDD 113 and ends this processing. Also, when the destination registration button 613 was not pressed at S513, the processing proceeds to S516 and the CPU 111 determines whether the cancel button 614 was pressed. This processing is ended when the cancel button 614 was pressed here, and proceeds to S512 when the cancel button 614 was not pressed.

This enables a destination having the FTP, SMB or WebDAV protocol that is input on the destination input screen to be registered if the destination is successfully authenticated, thus avoiding a situation where a destination to which transmission cannot be performed is registered as the forwarding destination.

If the protocol confirmed at S507 is other than FTP, SMB or WebDAV, the processing proceeds to S517 (FIG. 5B), and the CPU 111 transmits image data (test page) that contains wording indicating that transmission is for connection confirmation to the input destination. The processing proceeds to S518 after this transmission, and the CPU 111 displays a screen querying whether the transmitted image data was received in the form intended by the user.

FIG. 8A is a diagram showing an example of this query screen.

In FIG. 8A, reference numeral 801 denotes a message asking whether the user was able to confirm normal reception, and a "Confirmed" button 802 is pressed if the user was able to confirm normal reception. A "Not confirmed" button 803 is pressed in the case where the user was not able to confirm normal reception.

Next, the processing proceeds to S519 and the CPU 111 determines whether the user pressed the "Confirmed" button 802. When it is determined that the "Confirmed" button 802 was pressed, the processing proceeds to S512 (FIG. 5A), and the CPU 111 executes the aforementioned processing. On the other hand, when it is determined at S519 that the "Confirmed" button 802 was not pressed, the processing proceeds to S520 and the CPU 111 determines whether the "Not confirmed" button 803 was pressed. If the "Not confirmed" button 803 was not pressed, the processing returns to S518, whereas if the "Not confirmed" button 803 was pressed, the processing proceeds to S521. At S521, the CPU 111 displays the destination input screen of FIG. 6B or FIG. 7B, for example, and determines whether the cancel button 614 was pressed, and this processing is ended when the cancel button 614 was pressed. When the cancel button 614 was not pressed, the processing proceeds to S503.

Also, the processing proceeds to S522 (FIG. 5B) when the CPU 111 determines at S502 of FIG. 5A that the destination registration button 601 was not pressed. At S522, the CPU 111 determines whether the "Forwarding destination designation from address book" button 602 of FIG. 6A was pressed. When this "Forwarding destination designation from address book" button 602 was not pressed, the processing proceeds to S501 (FIG. 5A), whereas the processing proceeds to S523 when the "Forwarding destination designation from address book" button 602 was pressed. At S523, the CPU 111 displays an address book screen such as shown in FIG. 8B, for example.

FIG. 8B is a diagram showing an exemplary address book screen.

Here, reference numeral 810 denotes a destination selection area for selecting, as a destination, one of the electronic device 203, the Internet facsimile machine 204 and the Internet facsimile machine 205 that are included in the communication system of FIG. 2. A "Register destination" button 811 is a button for instructing to register the destination selected in the destination selection area 810 as the forwarding destination. A cancel button 812 is a button for cancelling the setting on this screen.

The processing proceeds to S524 following S523, and the CPU 111 determines whether a destination was selected on the screen of FIG. 8B. If a destination was not selected, the processing proceeds to S527, and it is determined whether the cancel button 812 was pressed. When the cancel button 812 was pressed at S527, this processing is ended, whereas when the cancel button 812 was not pressed, the processing proceeds to S523, and the address book screen is displayed.

The processing proceeds to S525 when a destination was selected at S524, and the CPU 111 determines whether the "Register destination" button 811 was pressed. The processing proceeds to S526 when it is determined that the "Register destination" button 811 was pressed, and the CPU 111 sets the selected destination as the forwarding destination and ends this processing. Also, when the "Register destination" button 811 was not pressed at S525, the processing proceeds to S527.

Here, when registering a destination of the forwarding destination from an address book, it is assumed that destinations registered in the address book are correct, and the destination to be used as the forwarding destination is registered without performing connection confirmation.

Figure 9:
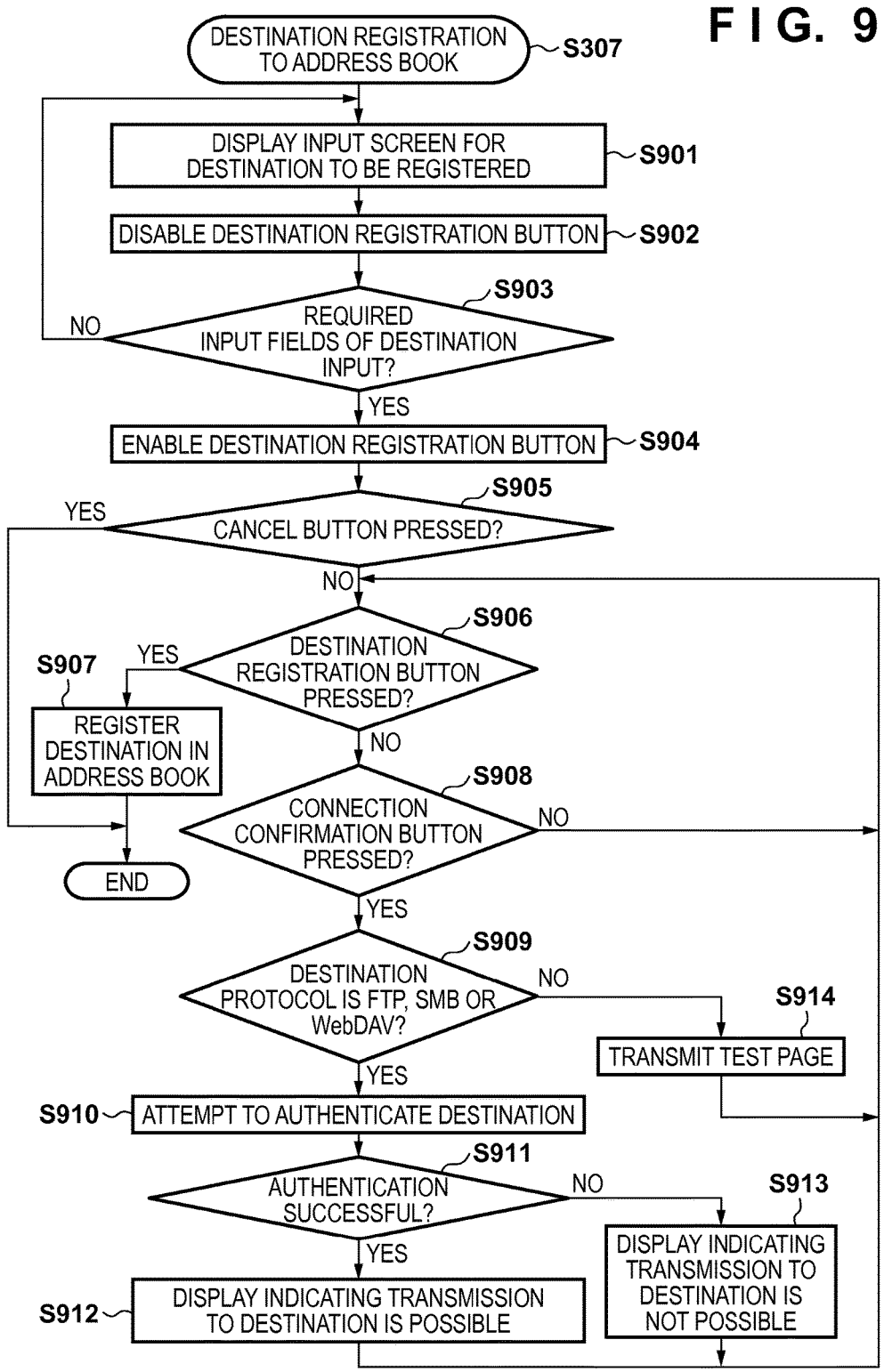
FIG. 9 is a flowchart illustrating destination registration processing to an address book of S307 in FIG. 3.

FIG. 9 is a flowchart illustrating the destination registration processing to an address book of S307 in FIG. 3.

First, at S901, the CPU 111 displays a destination input screen such as shown in FIG. 6B or FIG. 7A or 7B, for example, on the display unit of the input unit 114. Next, the processing proceeds to S902 and the CPU 111 disables the destination registration button 613 so that the button cannot be pressed. Next, the processing proceeds to S903 and the CPU 111 determines whether all the required fields of the destination to be registered have been input. When all the required fields have not been input, the processing returns to S901, whereas the processing proceeds to S904 when all the required fields have been input. At S904, the CPU 111 enables the destination registration button 613 disabled at S902, and proceeds to S905. At S905, the CPU 111 determines whether the cancel button 614 was pressed, and ends this processing when the cancel button 614 was pressed. When the cancel button 614 was not pressed at S905, the processing proceeds to S906 and the CPU 111 determines whether the destination registration button 613 on the destination input screen was pressed and an input instructing registration of the destination was performed. The processing proceeds to S907 when the destination registration button 613 was pressed at S906, and the CPU 111 registers the destination input on the destination input screen in the address book of the HDD 113 and ends this processing.

On the other hand, when the destination registration button 613 was not pressed at S906, the processing proceeds to S908 and the CPU 111 determines whether the connection confirmation button 612 was pressed. When this button 612 was not pressed, the processing proceeds to S906, whereas the processing proceeds to S909 when the connection confirmation button 612 was pressed. At S909, the CPU 111 determines whether the protocol of the input destination is one of FTP, SMB and WebDAV, similarly to S507 to S509 in FIG. 5A. If the protocol is one of FTP, SMB and WebDAV, the processing proceeds to S910 and the CPU 111 attempts to authenticate the input destination. Then, at S911, the CPU 111 determines whether the input destination was successfully authenticated, and if the input destination was successfully authenticated, the CPU 111 proceeds to S912 and performs display indicating that transmission is possible to that destination on the input unit 114, before proceeding to S906. On the other hand, the processing proceeds to S913 when it is determined at S911 that authentication failed, and the CPU 111 performs display indicating that transmission is not possible to that destination on the input unit 114 and proceeds to S906. Also, when it is determined at S909 that the protocol of the input destination is not one of FTP, SMB and WebDAV, the processing proceeds to S914, and the CPU 111 transmits a test page to the input destination, and the processing proceeds to S905. Although omitted in the flowchart of FIG. 9, processing similar to S518 to S520 in FIG. 5B enables the user to judge whether to register the destination in the address book after checking whether transmission was correctly performed.

According to the present embodiment, as described above, when registering a destination in an address book, the user is first able to check whether connection to a destination input through a destination input screen is possible, before judging whether to register the destination in the address book. Also, in the case where the protocol of the destination is FTP, SMB or WebDAV, the user is first able to check whether the destination was successfully authenticated, before judging whether to register the destination in the address book.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-062726, filed Mar. 25, 2014, which is hereby incorporated by reference wherein in its entirety.

What is claimed is:

1. An image communication apparatus that receives image data and transfers the received image data, comprising:
   a user interface configured to receive a transfer destination of image data to be received and authentication information used to transfer the image data to the transfer destination;
   a registration unit configured to register the transfer destination received by the user interface;
   a determination unit configured to determine whether or not authentication of the transfer destination using the authentication information received by the user interface succeeds; and
   a control unit configured to enable, in accordance with having determined by the determination unit that the authentication of the transfer destination using the authentication information received by the user interface succeeds, registration of the transfer destination by the registration unit,
   wherein at least one of the registration unit, the determination unit, and the control unit is implemented by a processor.

2. The image communication apparatus according to claim 1, further comprising:
   a selecting unit configured to select a communication protocol for communicating with the transfer destination,
   wherein the selecting unit is implemented by a processor.

3. The image communication apparatus according to claim 2, wherein if the communication protocol selected by the selecting unit is an E-mail, the user interface receives a mail address.

4. The image communication apparatus according to claim 2, wherein if the communication protocol selected by the selecting unit is FTP, SMB or WebDAV, the user interface receives at least a host name, a username and a password.

5. The image communication apparatus according to claim 4, wherein if the communication protocol selected by the selecting unit is FTP, SMB or WebDAV, the determination unit, based on the transfer destination received by the user interface, determines whether or not the authentication of the transfer destination using the user name and the password received by the user interface succeeds.

6. The image communication apparatus according to claim 1,
   wherein the registration unit registers, in accordance with an instruction button, the transfer destination received by the user interface, and
   the control unit disables the instruction button until it is determined by the determination unit that the authentication of the external apparatus using the authentication information received by the user interface succeeds.

7. A method for controlling an image communication apparatus that receives image data and transfers the received image data, comprising:
   receiving a transfer destination of image data to be received and authentication information used to transfer image data to the transfer destination;
   registering the transfer destination received in the receiving;
   determining whether or not authentication of an external apparatus using the authentication information received in the receiving succeeds; and
   in accordance with having determined in the determining that the authentication of the external apparatus using the authentication information received in the receiving succeeds, enabling registration of the transfer destination in the registering.

8. A computer-readable storage medium storing a computer program for controlling an image communication apparatus, the computer program comprising:
   a code configured to receive a transfer destination of image data to be received and authentication information used to transfer the received image data to the transfer destination;
   a code to register the received transfer destination;
   a code to determine whether or not authentication of an external apparatus using the received authentication information succeeds; and
   a code to enable, in accordance with having determined that the authentication of the external apparatus using the received authentication information succeeds, registration of the transfer destination.

* * * * *